US012744292B2

(12) United States Patent
Lebby et al.

(10) Patent No.: US 12,744,292 B2
(45) Date of Patent: Sep. 22, 2026

(54) SLOT MODULATORS WITH ENGINEERED RAILS FOR IMPROVED PERFORMANCE

(71) Applicant: LIGHTWAVE LOGIC, INC., Englewood, CO (US)

(72) Inventors: Michael Lebby, San Francisco, CA (US); Felipe Lorenzo Della lucia, Paulinia (BR); Jasper A. Drisko, Portland, ME (US)

(73) Assignee: LIGHTWAVE LOGIC, INC., Englewood, CO (US)

( * ) Notice: Subject to any disclaimer, the term of this patent is extended or adjusted under 35 U.S.C. 154(b) by 3 days.

(21) Appl. No.: 19/011,354

(22) Filed: Jan. 6, 2025

(65) Prior Publication Data

US 2025/0226560 A1 Jul. 10, 2025

Related U.S. Application Data

(60) Provisional application No. 63/619,216, filed on Jan. 9, 2024.

(51) Int. Cl.
*H01P 1/00* (2006.01)
*H01P 3/00* (2006.01)

(52) U.S. Cl.
CPC ................ *H01P 1/00* (2013.01); *H01P 3/003* (2013.01)

(58) Field of Classification Search
CPC .................................. H01P 1/00; H01P 3/003
See application file for complete search history.

(56) References Cited

U.S. PATENT DOCUMENTS

| | | | | |
|---|---|---|---|---|
| 8,380,016 | B1 * | 2/2013 | Hochberg | G02F 1/2257 385/40 |
| 11,709,384 | B2 * | 7/2023 | Mitamura | G02F 1/065 385/2 |
| 11,768,391 | B2 * | 9/2023 | Poulin | G02F 1/2255 385/3 |
| 2023/0280605 | A1 * | 9/2023 | Lebby | G02F 1/025 385/2 |

OTHER PUBLICATIONS

Heiner Zwickel, Stefan Singer, Clemens Kieninger, Yasar Kutuvantavida, Narek Muradyan, Thorsten Wahlbrink, Shiyoshi Yokoyama, Sebastian Randel, Wolfgang Freude, and Christian Koos, "Verified equivalent-circuit model for slot-waveguide modulators," Opt. Express 28, 12951-12976 (2020) (Year: 2020).*

* cited by examiner

*Primary Examiner* — Andrea Lindgren Baltzell
*Assistant Examiner* — Kimberly E Glenn
(74) *Attorney, Agent, or Firm* — Michael Best & Friedrich LLP

(57) ABSTRACT

A slot modulator coupled to a coplanar transmission line including a pair of spaced apart engineered rails forming a waveguide slot therebetween and opposed slabs coupling the engineered rails to the coplanar transmission line. The engineered rails formed at least partially of highly doped silicon and the slabs formed at least partially of highly doped silicon.

15 Claims, 11 Drawing Sheets

SLOT MODULATORS WITH ENGINEERED RAILS FOR IMPROVED PERFORMANCE

CROSS REFERENCE TO RELATED APPLICATIONS

This application claims the benefit of U.S. Provisional Application No. 63/619,216, filed 9 Jan. 2024.

AUTHORIZATION

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD OF THE INVENTION

The present invention generally relates to slot modulators and more specifically to slot modulators with improved performance.

BACKGROUND OF THE INVENTION

Slot modulators are well known in the art. Generally, a Mach-Zehnder type of modulator is provided by placing two slot waveguides in parallel and driving them in push-pull with a single coplanar transmission line. Generally, the slot waveguides used are standard of-the-shelf items and the rf and bandwidth performance is less than ideal.

It would be highly advantageous, therefore, to remedy the foregoing and other deficiencies inherent in the prior art.

Accordingly, it is an object of the present invention to provide new and improved slot modulators.

It is another object of the present invention to provide new and improved slot modulators with engineered rails.

SUMMARY OF THE INVENTION

Briefly, to achieve the desired objects and advantages of the instant invention, provided is a slot modulator coupled to a coplanar transmission line including a pair of spaced apart engineered rails forming a waveguide slot therebetween and opposed slabs coupling the engineered rails to the coplanar transmission line. The engineered rails formed at least partially of highly doped silicon and the slabs formed at least partially of highly doped silicon. The pair of engineered rails each have at least one altered vertex. The altered vertex can include an angled vertex, a rounded vertex, a reverse rounded vertex or a custom geometry. Alternatively, the pair of engineered rails each have an altered surface charge alone or in addition to the altered vertices. The waveguide slot of the slot modulator can also have an altered profile by an outwardly directed or inwardly directed angle to the pair of engineered rails.

Also provided is a method of fabricating a slot modulator coupled to a coplanar transmission line. The method includes the steps of providing a substrate with the coplanar transmission line thereon, the coplanar transmission line including at least one pair of spaced apart conductors. A pair of spaced apart elongated engineered rails are formed on the substrate between the pair of spaced apart conductors. The spaced apart engineered rails define an elongated waveguide slot therebetween. The engineered rails are formed of highly doped silicon. Opposed slabs are formed on the substrate coupling the engineered rails to the spaced apart conductors of the coplanar transmission line. The slabs are formed at least partially of highly doped silicon. An EO polymer cladding layer is deposited over the slabs and engineered rails and in the waveguide slot.

BRIEF DESCRIPTION OF THE DRAWINGS

Specific objects and advantages of the invention will become readily apparent to those skilled in the art from the following detailed description of illustrative embodiments thereof, taken in conjunction with the drawings in which:

FIG. 12 is an end view of a slot modulator with −ev rail surfaces; and

DETAILED DESCRIPTION

The present invention consists of a variety of engineered changes to the geometry and/or surface charges of the rails of slot modulators to improve both rf performance and bandwidth. The various changes or modifications can be included individually or in any convenient and workable combination. Conventional rails include vertically perpendicular sides, perpendicularly angled vertices and neutral surface charges. Engineered rails, according to the present invention, have geometries and/or surface charges differing from the conventional rails in order to change the charge profile of the structure. Thus, the term “engineered rails” are intended to define rails having geometries and surface charges not present in conventional rails. The geometries and surface charges of the engineered rails are used to selectively alter the charge profile changing both rf performance and bandwidth. Some examples of geometries that can be incorporated are illustrated and described below in conjunction with FIGS. 2 through 10. Examples of changes to surface charges that can be incorporated are illustrated and described below in conjunction with FIGS. 11 through 13.

Figure 1:
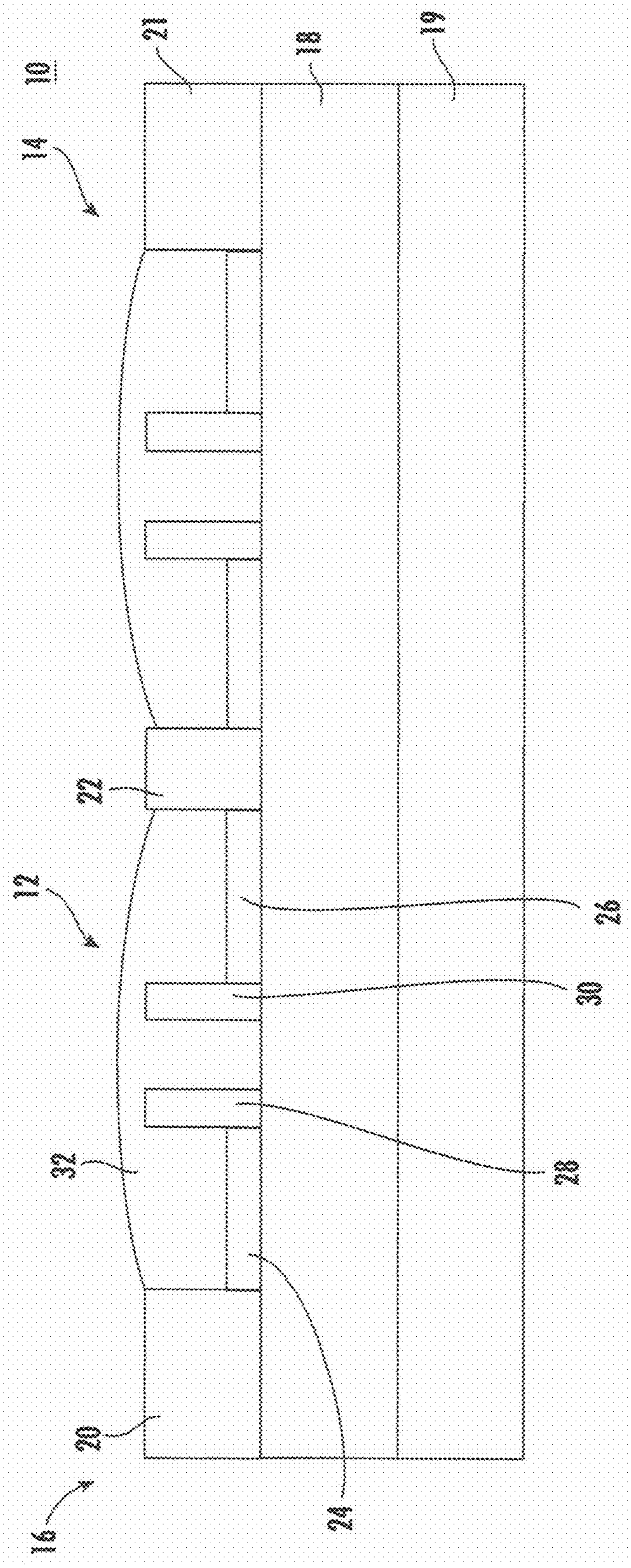
FIG. 1 is an end view of a slot modulator.

Referring specifically to FIG. 1, an end view of a slot modulator 10 is illustrated which in this example is a Mach-Zehnder modulator including two slot waveguides 12 and 14 in parallel and driven in push-pull with a single coplanar transmission line 16. It should be understood that a single slot waveguide can be used to form a slot modulator in accordance with the present invention. In this example, a typical SiO2 box 18 is formed on a silicon substrate 19. Transmission line 16 is formed of spaced apart aluminum conductors positioned on SiO2 box 18 with G conductors 20 and 21 on each edge and an S conductor 22 extending midway therebetween. Slot waveguide 12 includes a slab 2 24 extending inwardly from G conductor 20 and a slab 26 extending inwardly from S conductor 22. Slabs 24 and 26 are preferably at least partially highly doped. A vertically extending rail 28 is attached to the inner end of slab 24 and a vertically extending rail 30, spaced from rail 28 to form slot 29, is attached to the inner end of slab 26. Engineered rails 28 and 30 primarily form slot waveguide 12. rails 28 and 30 are preferably at least partially highly doped. The area between G conductor 20 and S conductor 22, including slot 29 formed between engineered rails 28 and 30, is filled with EO polymer cladding material 32. Slot waveguide 14 is a mirror image of slot waveguide 12 with slabs and engineered rails positioned and connected as described in conjunction with slot waveguide 12. In the following disclosure, only slot waveguide 12 is discussed in detail with the understanding that all of the details apply similarly to slot waveguide 14.

Figure 2:
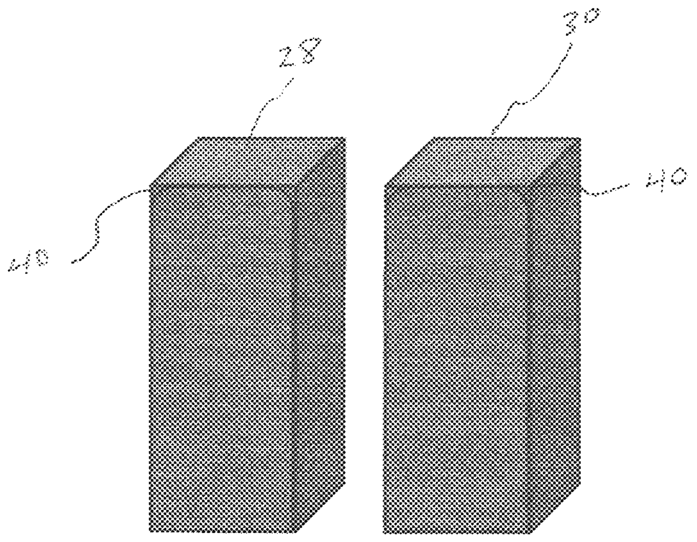
FIG. 2 is an enlarged perspective view of the engineered rails of the slot modulator of FIG. 1 with rounded vertices, according to the present invention.

Turning now to FIG. 2, engineered rails 28 and 30 are illustrated having at least one altered vertex. An altered vertex is one that differs from a conventional perpendicularly angled vertex. In this embodiment the altered vertex is a rounded vertex 40. While one rounded vertex 40 is illustrated on each, more of the vertices of engineered rails 28 and 30 can be rounded as required to achieve the desired results. In other words, one or all of the corners of engineered rails 28 and 30 can be rounded. The rounding of one or more vertices changes the charge profile of the semiconductor.

Figure 3:
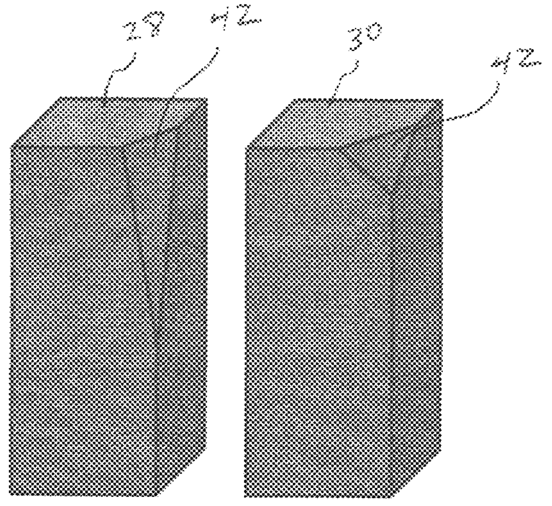
FIG. 3 is an enlarged perspective view of the engineered rails of the slot modulator of FIG. 1 with angled vertices, according to the present invention.

Referring now to FIG. 3, engineered rails 28 and 30 are illustrated having at least one altered vertex, in this embodiment, an angled vertex 42. While one angled vertex 42 is illustrated on each, more of the vertices of engineered rails 28 and 30 can be angled as required to achieve the desired results. Additionally, angled vertices 42 one each rail 28 and 29 can be different (as illustrated) on the same slot waveguide 14. In other words, one or all of the corners of engineered rails 28 and 30 can be angled with the same or different angles being used. Angled vertices 42 change the charge profile of the semiconductor.

Figure 4:
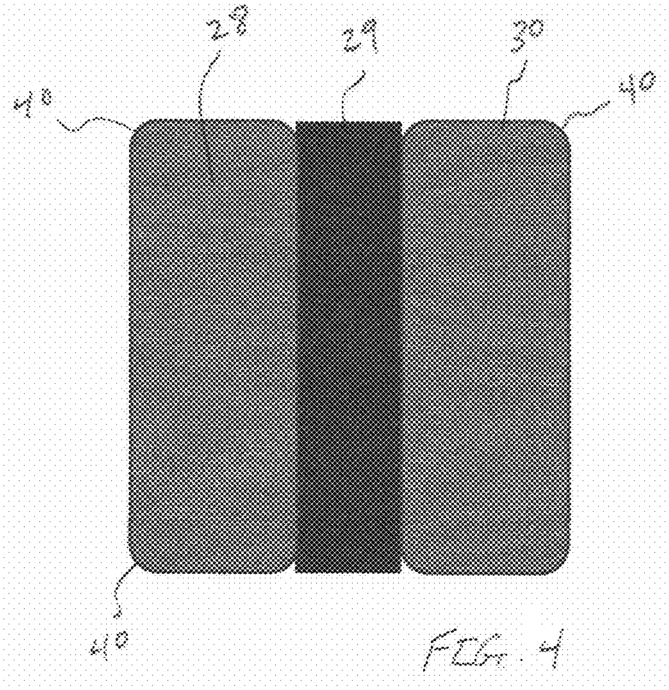
FIG. 4 is an enlarged end view of the engineered rails and slot of the slot modulator of FIG. 1, the engineered rails having rounded vertices.

With reference to FIG. 4, engineered rails 28 and 30, and slot 29 of slot modulator 12 are illustrated. As can be seen, all four vertices of engineered rails 28 and 30 have been rounded to form rounded vertices 40. As described previously, one or more of the vertices can be rounded to alter the charge profile as desired.

Figure 5:
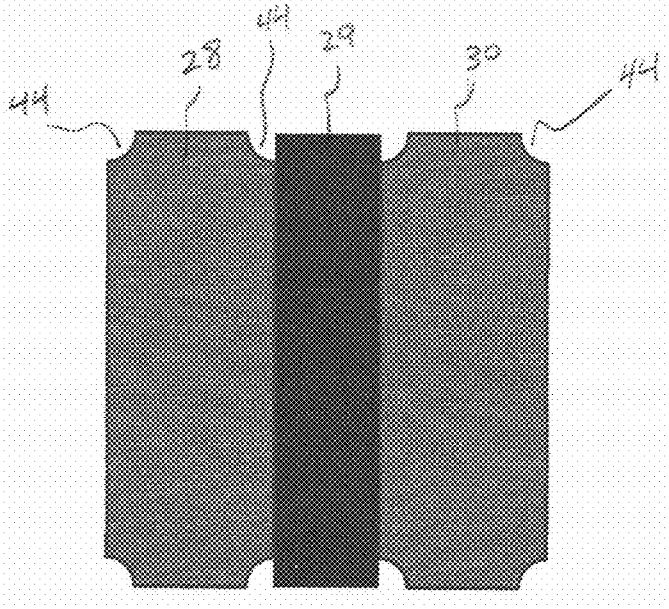
FIG. 5 is an enlarged end view of the engineered rails and slot of the slot modulator of FIG. 1, the engineered rails having reverse rounded vertices.

Referring to FIG. 5, engineered rails 28 and 30, and slot 29 of slot modulator 12 are illustrated. In this embodiment, all four vertices of engineered rails 28 and 30 have been shaped to include reverse rounded vertices 44 as an example of an engineered geometry for the vertices. As described previously, one or more of the vertices can be reverse rounded to alter the charge profile as desired.

Figure 6:
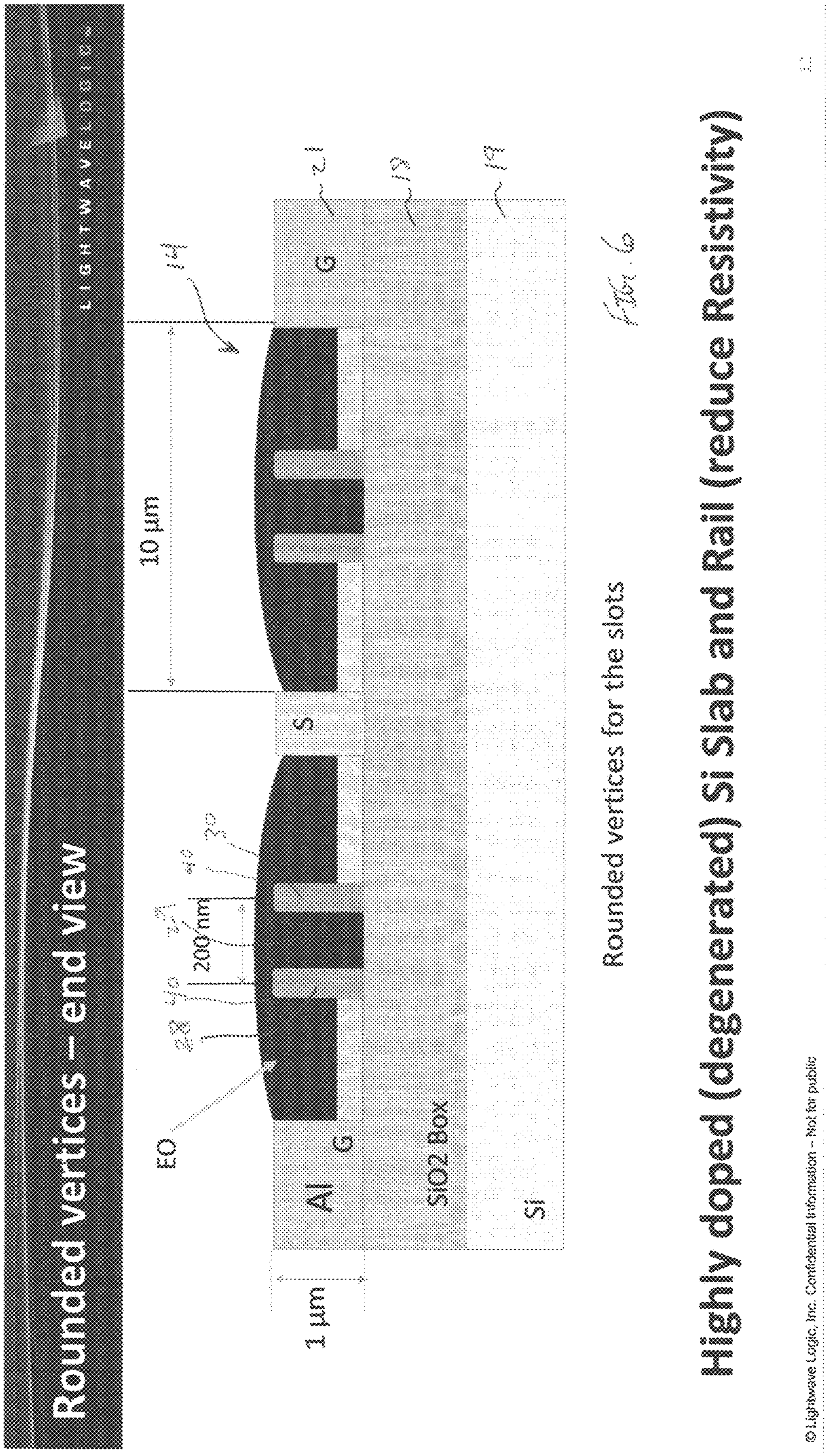
FIG. 6 is an end view of a slot modulator with rounded vertices of the engineered rails.
Figure 7:
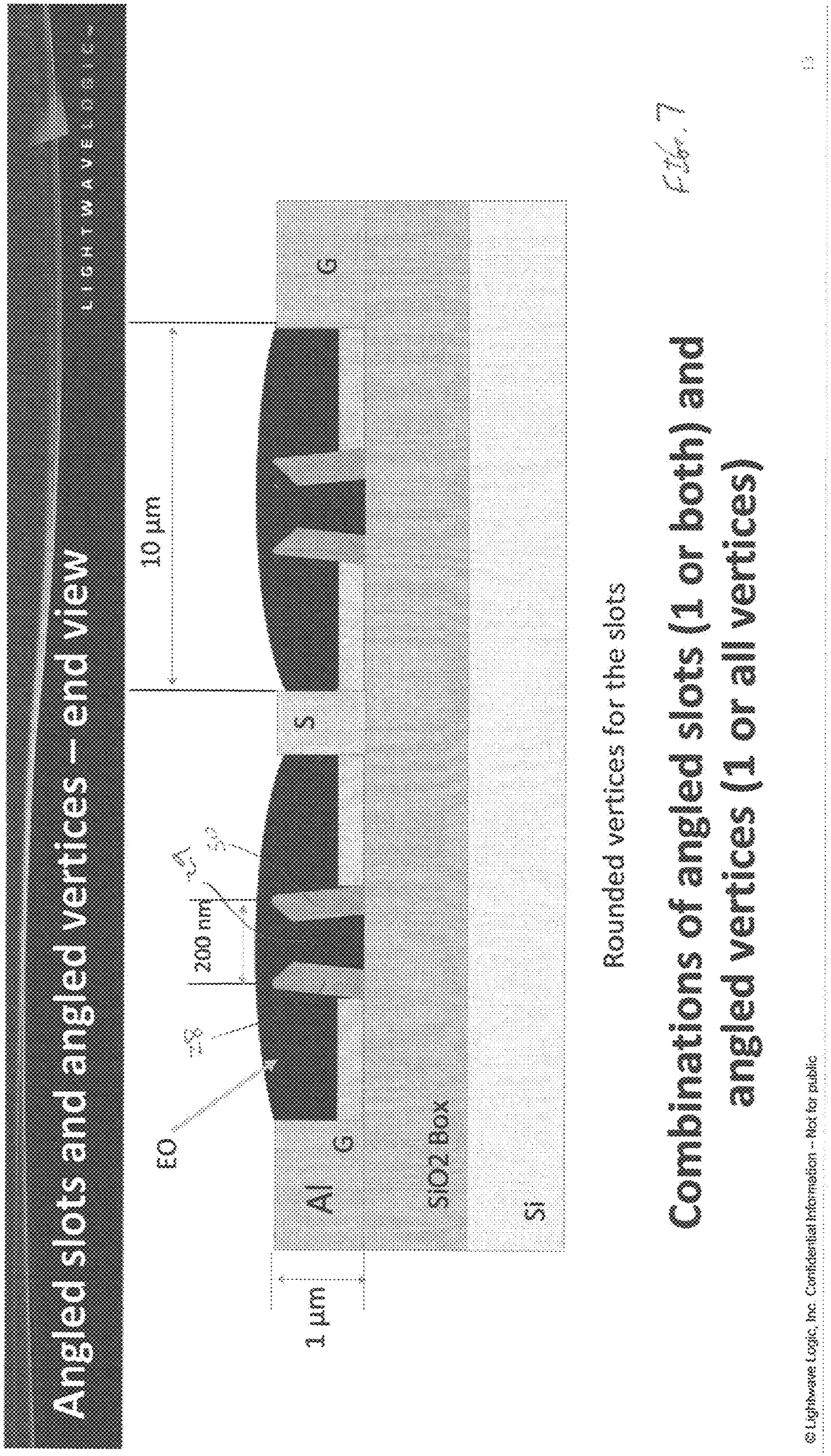
FIG. 7 is an end view of a slot modulator with an inwardly angled slot profile and angled vertices of the engineered rails.
Figure 8:
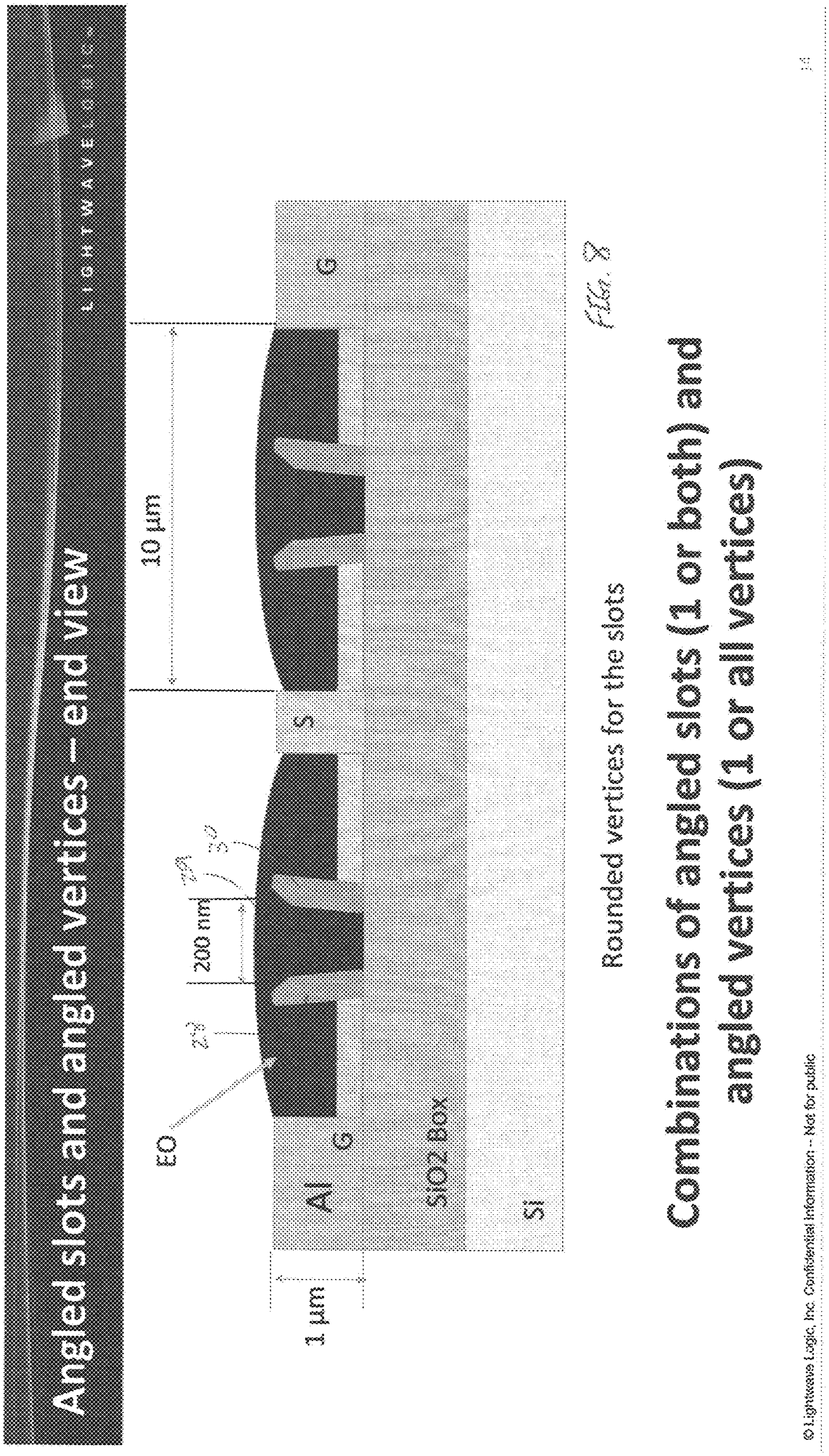
FIG. 8 is an end view of a slot modulator with an outwardly angled slot profile and angled vertices of the engineered rails.
Figure 9:
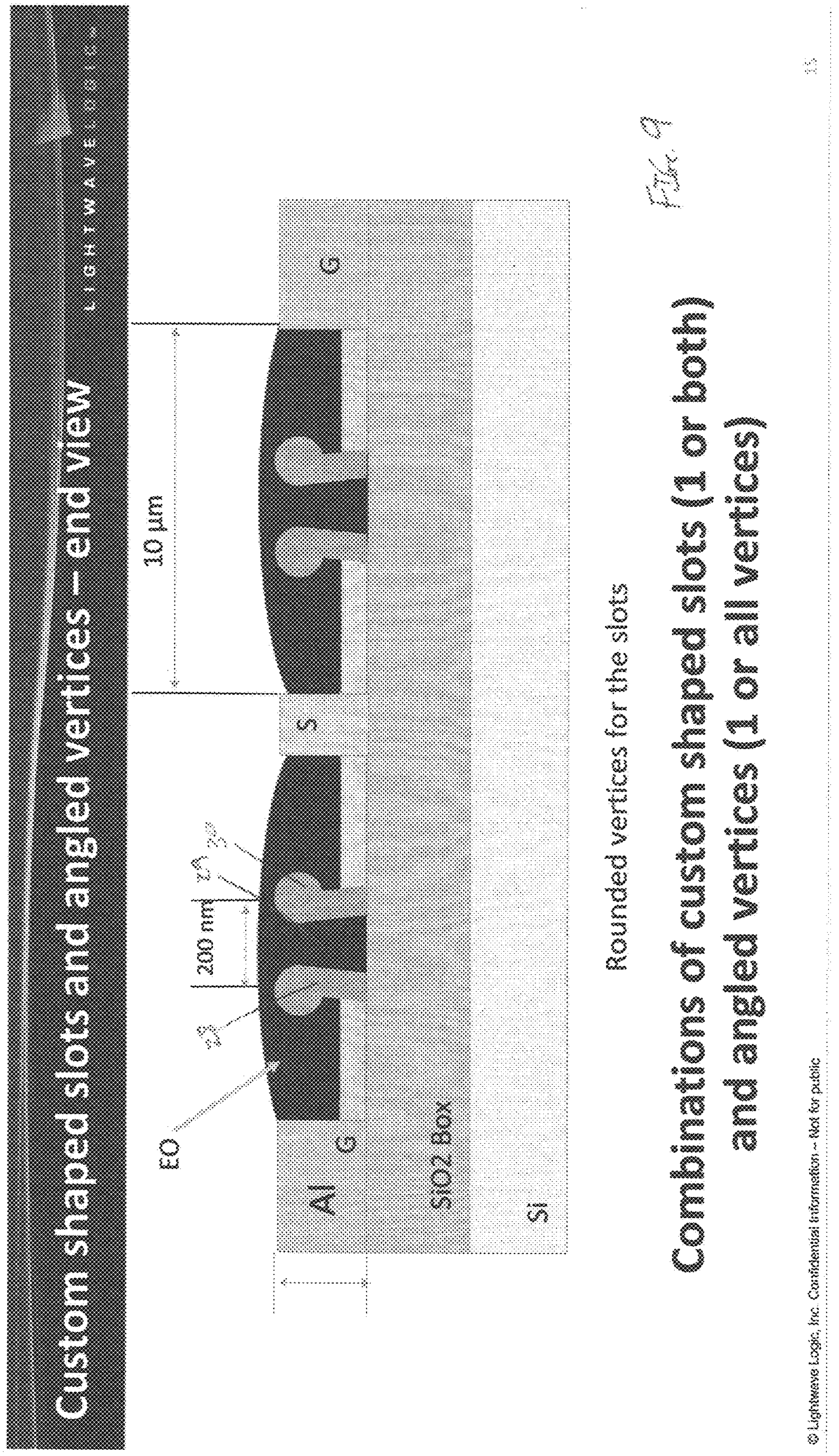
FIG. 9 is an end view of a slot modulator with a custom slot profile and angled and rounded vertices of the engineered rails.
Figure 10:
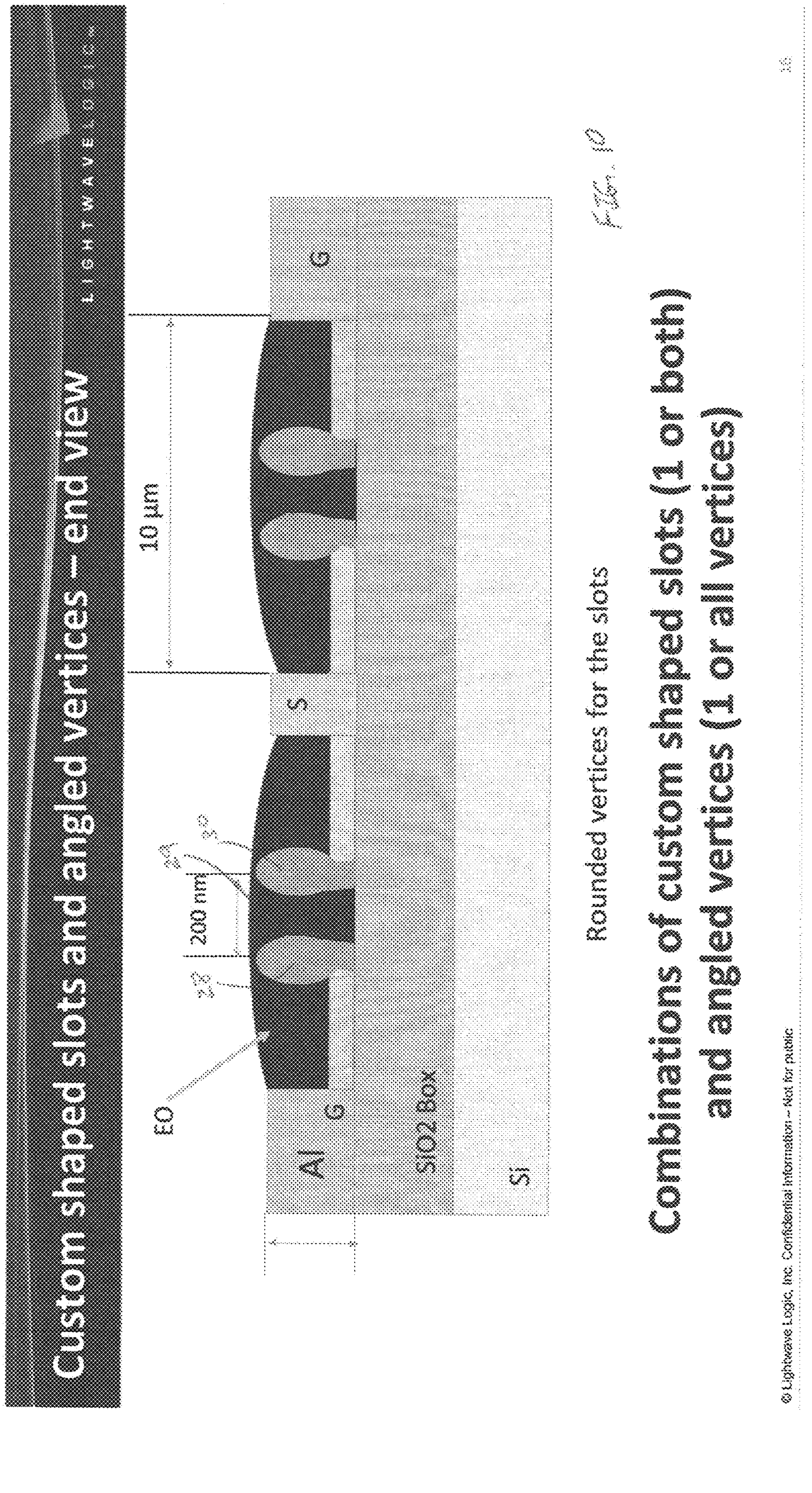
FIG. 10 is an end view of a slot modulator with a custom slot profile and rounded vertices of the engineered rails.

Referring to FIGS. 6-10, various examples of geometries of engineered rails 28 and 30 in slot waveguides 12 and 14 are illustrated. FIG. 6 illustrates rounded vertices 40 on engineered rails 28 and 30 as previously described, with engineered rails 28, 30 and slabs 24, 26 being highly doped to reduce resistivity. FIG. 7 illustrates a custom geometry of slot 29. Slot 29 is angled inwardly due to an inward slant of engineered rails 28 and 30. The non-perpendicular angle of engineered rails 28 and 30 establish the engineered characteristic as it differs from the conventional rails. Additionally, engineered rails 28 and 30 are angled at one or more vertices. FIG. 8 illustrates another custom geometry of slot 29. Slot 29 is angled outwardly due to an outward slant of engineered rails 28 and 30. Additionally, engineered rails 28 and 30 are angled at one or more vertices. FIGS. 9 and 10 each illustrate an inwardly angled slot 29 due to an inward slant of engineered rails 28 and 30. Additionally, engineered rails 28 and 30 are custom shaped (custom geometry) to include novel angles and curves as illustrated. The combination of various shaped vertices and slot profiles allow adjustment of the charge profile of the semiconductor.

Figure 11:
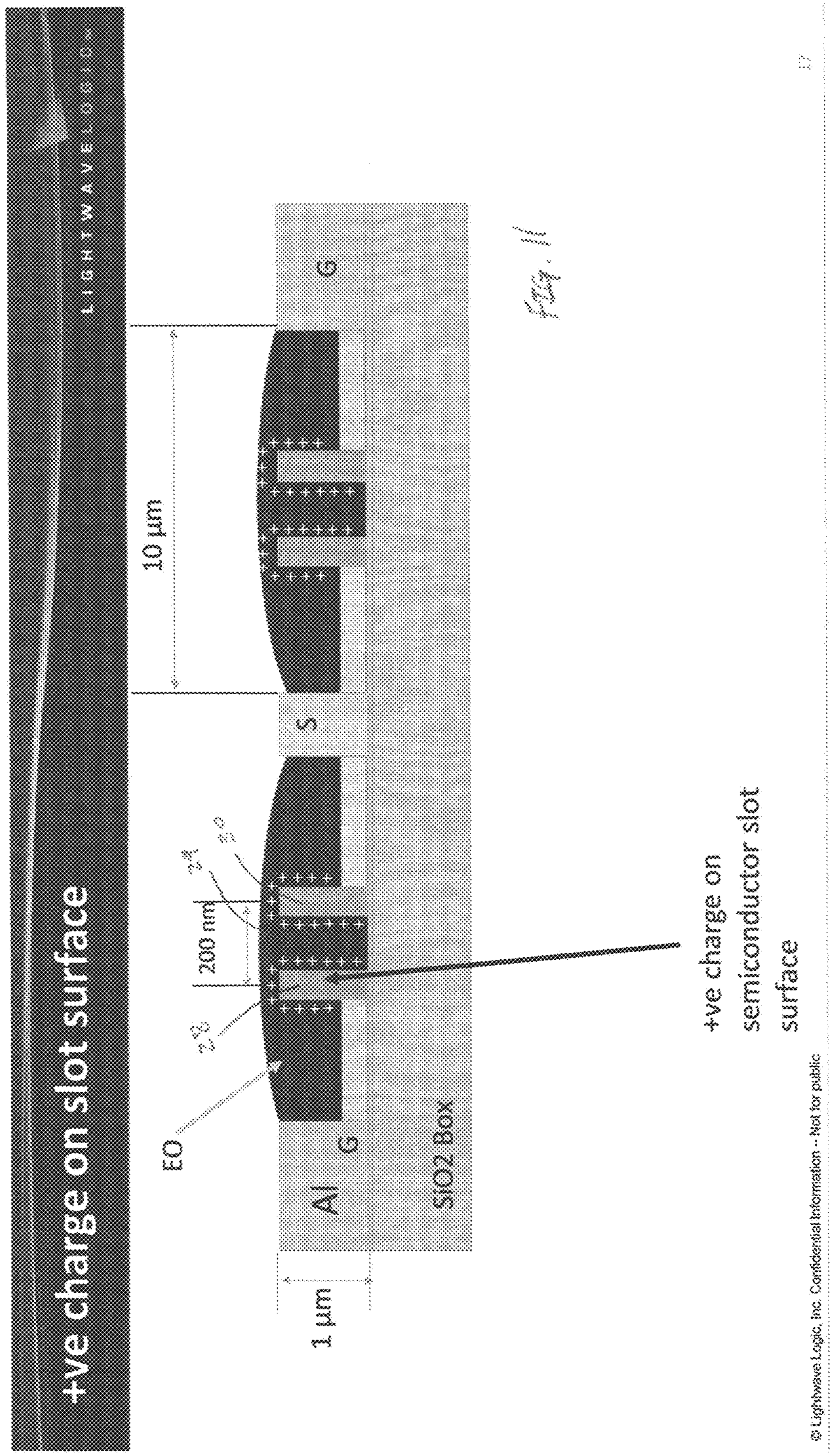
FIG. 11 is an end view of a slot modulator with +ev rail surfaces.
Figure 1Z:
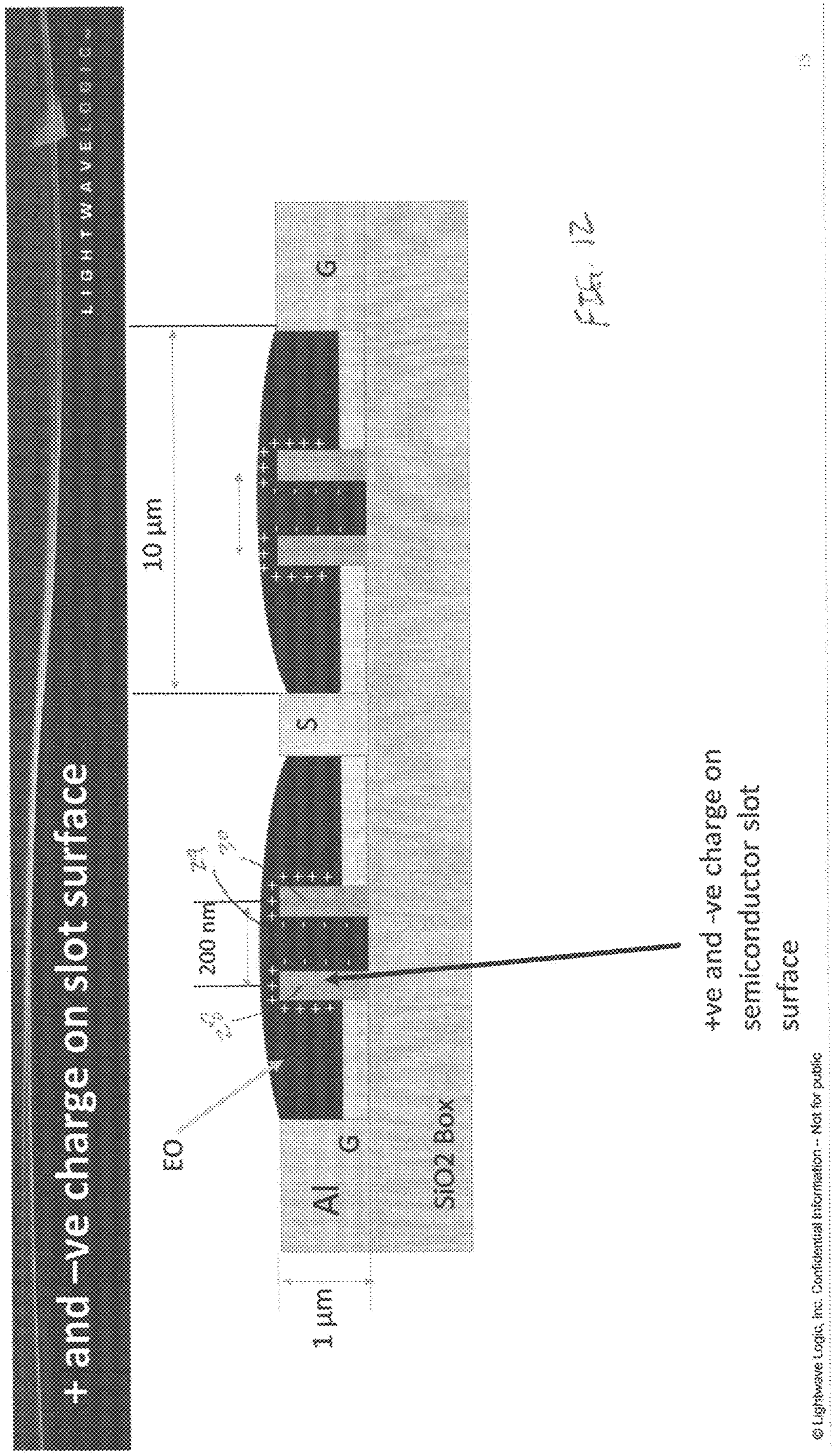
Figure 13:
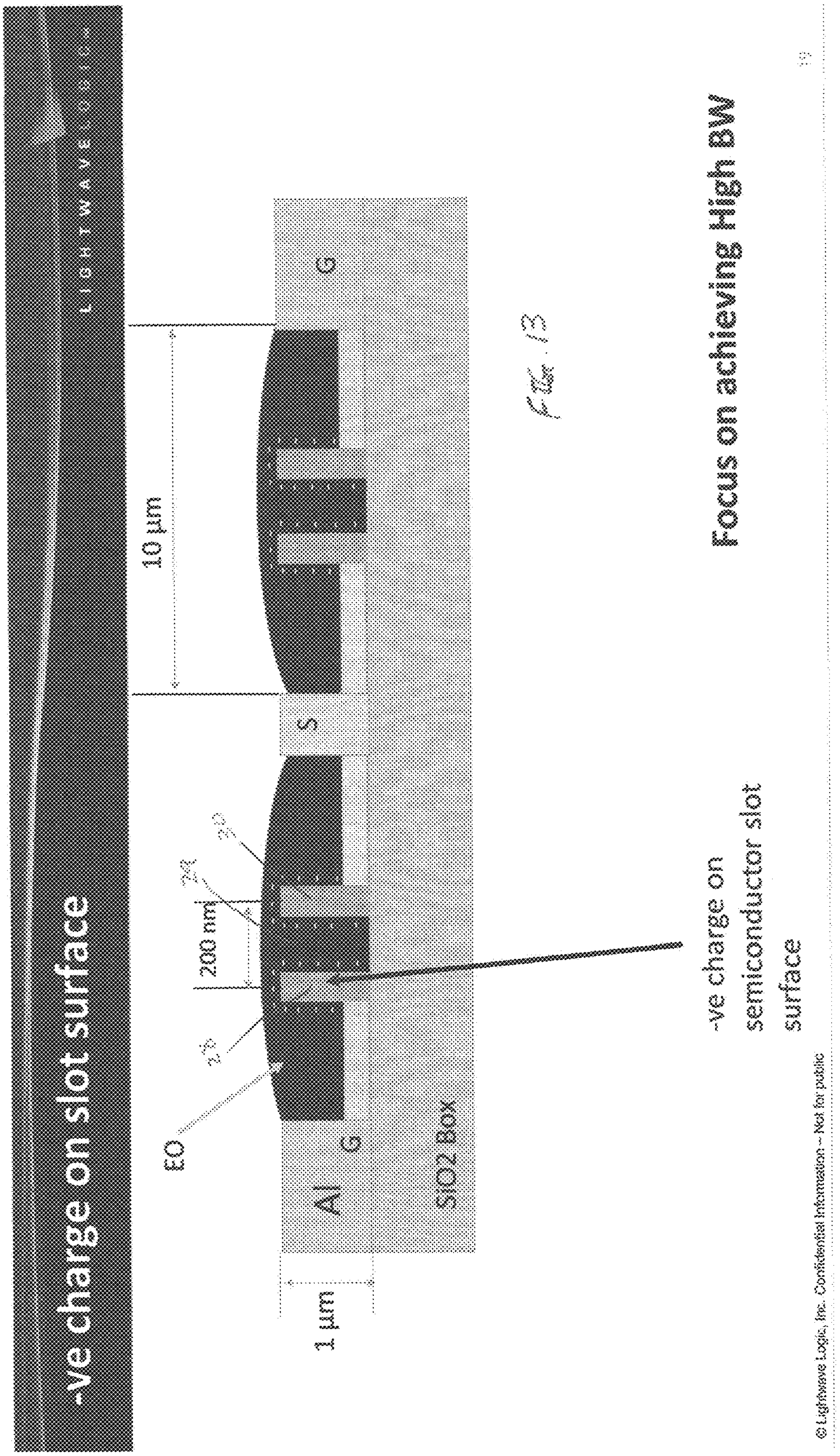
FIG. 13 is an end view of a slot modulator with +ev and −ev rail surfaces.

Referring now to FIGS. 11-13, various examples of changes to surface charges that can be incorporated into engineered rails 28 and 29 are illustrated. FIG. 11 illustrates a +ve charge on engineered rails 28 and 30. FIG. 12 illustrates a +ve charge on the outer surface of engineered rails 28 and 30 opposite slot 29 and a −ev charge on the inner surface adjacent slot 29. FIG. 13 illustrates a −ve charge on engineered rails 28 and 30. These charges can be created in different ways. They can be created using implant or diffuse dopants such as hydrogen, silicon, magnesium, zinc and the like. They can also be formed by treating the surfaces in a dopant rich atmosphere; by etching the surface to expose an underlying layer that carries the desired charge; by depositing a layer that carries a desired charge; by using precharged material such as doped silicon; and by use of annealing/temperature cycling to increase/decrease the charge at the surface.

One skilled in the art will understand that the previously described geometries and surface charges can be used separately or combined with other techniques such as high doping on slabs and engineered rails, metalized elements and the like.

The present invention is described above with reference to illustrative embodiments. Those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the invention, they are intended to be included within the scope thereof.

The invention claimed is:

1. A slot modulator coupled to a coplanar transmission line, the slot modulator comprising:

a pair of spaced apart engineered rails forming a waveguide slot therebetween and opposed slabs coupling the engineered rails to the coplanar transmission line, the engineered rails being formed at least partially of highly doped silicon; and the slabs being formed at least partially of highly doped silicon.

2. The slot modulator claimed in claim 1 wherein the pair of engineered rails each have at least one altered vertex.

3. The slot modulator claimed in claim 2 wherein the at least one altered vertex includes one of an angled vertex, a rounded vertex, a reverse rounded vertex and a custom geometry.

4. The slot modulator claimed in claim 1 wherein the pair of engineered rails each have an altered surface charge.

5. The slot modulator claimed in claim 1 wherein the waveguide slot has an altered profile by an outwardly directed or inwardly directed angle to the pair of engineered rails.

6. A Mach-Zehnder slot modulator coupled to a coplanar transmission line, the slot modulator comprising:

a substrate;

the coplanar transmission line positioned on the substrate and including first and second spaced apart elongated conductors with a third elongated conductor positioned midway between the first and second conductors;

a first pair of spaced apart engineered rails positioned on the substrate between the first elongated conductor and the second elongated conductor and a second pair of spaced apart engineered rails positioned on the substrate between the second elongated conductor and the third elongated conductor, the first and second pairs of spaced apart engineered rails each forming an elongated waveguide slot therebetween, the engineered rails being formed of doped silicon;

opposed slabs positioned on the substrate and coupling the first and second pairs of engineered rails to the elongated conductors of the coplanar transmission line, the slabs being formed of doped silicon; and EO polymer cladding material deposited over the first and second pairs of spaced apart engineered rails and the slabs between the elongated conductors and in the waveguide slots.

7. The slot modulator claimed in claim 6 wherein the pair of engineered rails each have at least one altered vertex.

8. The slot modulator claimed in claim 7 wherein the at least one altered vertex includes one of an angled vertex, a rounded vertex, a reverse rounded vertex and a custom geometry.

9. The slot modulator claimed in claim 6 wherein the pair of engineered rails each have an altered surface charge.

10. The slot modulator claimed in claim 6 wherein the waveguide slot has an altered profile by an outwardly directed or inwardly directed angle to the pair of engineered rails.

11. A method of fabricating a slot modulator coupled to a coplanar transmission line, the method comprising the steps of:

providing a substrate with the coplanar transmission line thereon, the coplanar transmission line including at least one pair of spaced apart conductors;

forming a pair of spaced apart elongated engineered rails on the substrate between the pair of spaced apart conductors, the spaced apart engineered rails defining an elongated waveguide slot therebetween, the engineered rails being formed at least partially of highly doped silicon;

forming opposed slabs on the substrate coupling the engineered rails to the spaced apart conductors of the coplanar transmission line, the slabs being formed at least partially of highly doped silicon; and depositing an EO polymer cladding layer over the slabs and engineered rails and in the waveguide slot.

12. The method as claimed in claim 11 wherein the step of forming a pair of spaced apart elongated engineered rails includes forming the pair of engineered rails includes forming the pair of engineered rails each have at least one altered vertex.

13. The method as claimed in claim 12 wherein the step of forming a pair of spaced apart elongated engineered rails includes the at least one altered vertex being one of an angled vertex, a rounded vertex, a reverse rounded vertex and a custom geometry.

14. The method as claimed in claim 11 wherein the step of forming a pair of spaced apart elongated engineered rails includes the pair of engineered rails each have an altered surface charge.

15. The method as claimed in claim 11 wherein the step of forming a pair of spaced apart elongated engineered rails includes forming the pair of engineered rails with an outwardly directed or inwardly directed angle to alter the profile of the waveguide slot.

* * * * *